United States Patent [19]

Kobayashi

[11] Patent Number: 4,936,191
[45] Date of Patent: Jun. 26, 1990

[54] POWER PISTON ASSEMBLY OF A BRAKE BOOSTER

[75] Inventor: Michio Kobayashi, Saitama, Japan
[73] Assignee: Jidosha Kiki Co., Ltd., Tokyo, Japan
[21] Appl. No.: 216,920
[22] Filed: Jul. 7, 1988

[30] Foreign Application Priority Data

Jul. 8, 1987 [JP] Japan .................. 62-104723[U]

[51] Int. Cl.⁵ ............................................ F15B 9/10
[52] U.S. Cl. ............................. 91/369.2; 91/376 R
[58] Field of Search ............... 91/369.1, 369.2, 369.3, 91/369.4, 376 R

[56] References Cited

U.S. PATENT DOCUMENTS

| 4,117,769 | 10/1978 | Carre et al. | 91/369.3 X |
| 4,286,501 | 9/1981 | Thomas et al. | 91/376 R |
| 4,354,423 | 10/1982 | Ohmi et al. | 91/376 R |
| 4,406,213 | 9/1983 | Haar | 91/369.3 X |
| 4,587,884 | 5/1986 | Tsubouchi | 91/376 R X |
| 4,587,885 | 5/1986 | Boehm et al. | 91/369.2 X |
| 4,800,799 | 1/1989 | Nishii | 91/376 R X |

FOREIGN PATENT DOCUMENTS 2175660 12/1986 United Kingdom .............. 91/369.1

Primary Examiner—Edward K. Look
Attorney, Agent, or Firm—Sughrue, Mion, Zinn, Macpeak & Seas

[57] ABSTRACT

A power piston assembly of a brake booster includes a power piston including a stepped cylindrical portion having a through-hole. A diaphragm is provided on the rear surface of the power piston. The diaphragm has an inner-circumferential bead which is connected to the rear end of the cylindrical portion of the power piston. The valve body has a stepped cylindrical portion which engages with the stepped portion of the power piston and is disposed in the through-hole of the power piston with the diaphragm bead in sealing contact with the valve body. A retainer is pressed fitted into the cylindrical portion of the power piston so as to abut the front surface of the valve body to secure the valve body in close contact with the power piston.

1 Claim, 1 Drawing Sheet

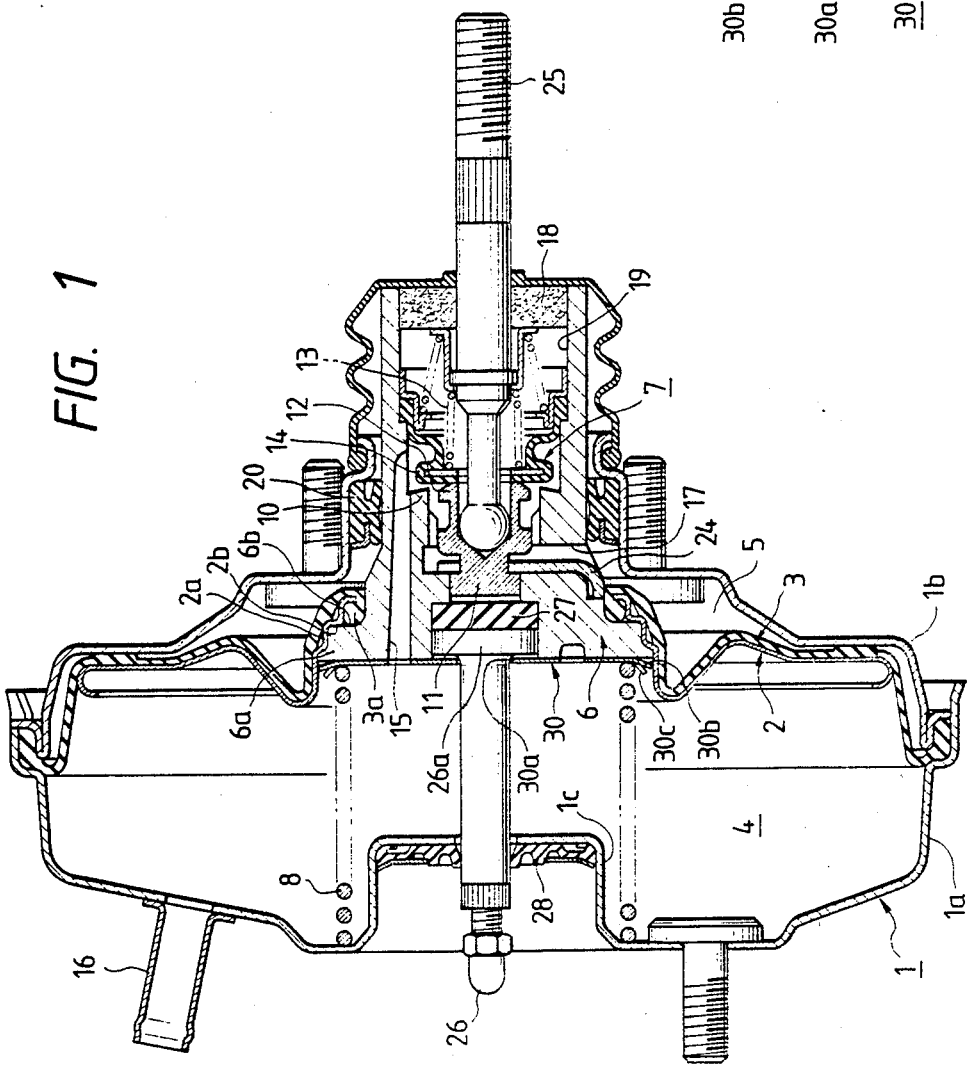

POWER PISTON ASSEMBLY OF A BRAKE BOOSTER

BACKGROUND OF THE INVENTION

1. Field Of The Invention

The present invention relates to a power piston assembly of a brake booster, and particularly relates to a structure for connecting a valve body and a power piston with each other in a power piston assembly of a brake booster.

2. Description Of The Prior Art

In a brake booster, generally a valve body and a power piston are separately manufactured and integrally connected to each other through a suitable connector. Conventional connectors which are known include a screw-type connector and a bayonet type connector (Japanese Utility Model Unexamined Publication No. 56-3056 and Japanese Patent Unexamined Publication No. 57-18552).

However, the problem with these connector types is that the assembly of the screw-type is difficult and the manufacturing of the bayonet-type is complicated and therefore expensive. Accordingly, an inexpensive and easy to assemble connector has been therefore eagerly desired.

SUMMARY OF THE INVENTION

It is therefore an object of the present invention to solve the problem in the prior art as described above.

In order to attain the above object, according to the present invention, the power piston assembly of a brake booster includes a power piston including a stepped cylindrical portion having a through-hole; a diaphragm provided on the rear surface of the power piston in the operational direction of the power piston, the diaphragm having an inner-circumferential bead which is connected to the rear end of the cylindrical portion of the power piston: a valve body having a stepped cylindrical portion corresponding to the stepped cylindrical portion of the power piston, the valve body being disposed in the through-hole of the power piston such that the stepped cylindrical portion of the valve body engages the stepped portion of the power piston on a front side thereof, and the diaphragm bead is in sealing contact with the valve body and a retainer press fitted into the cylindrical portion of the power piston from a front side thereof so that the retainer abuts on the front end surface of the valve body.

Such a structure can be made only by the process of forming a cylindrical portion and a stepped portion on the power piston, a stepped portion on the valve body, and a retainer which can be press fitted into the cylindrical portion of the power piston. Such a structure can be manufactured extremely inexpensively.

When the valve body and the power piston are connected to each other, it is possible to tightly attach the inner-circumferential bead portion of the diaphragm to the valve body so as to make a seal therebetween by fitting the valve body into the cylindrical portion of the power piston. Further, the valve body can b ®integrally connected to the cylindrical portion by securing the valve body between the stepped surface of the cylindrical portion and the retainer. That is, the stepped surface of the cylindrical portion is engaged with the stepped surface of the valve body from the back side thereof and the retainer is fittingly pressed into the cylindrical portion from the front side such that the retainer abuts the front end surface of the valve body.

BRIEF DESCRIPTION OF THE DRAWINGS

Other features and advantages of the present invention will be apparent from the following description taken in connection with the accompanying drawings, wherein:

FIG. 1 is a cross-section showing an embodiment of the present invention; and

FIG. 2 is a front view of a retainer 30 shown in FIG. 1.

DETAILED DESCRIPTION OF THE PREFERRED EMBODIMENT

Referring to the drawings, an embodiment of the present invention will be described hereunder.

In FIG. 1, a shell 1 of a brake booster is constituted by a front shell portion 1a and a rear shell portion 1b. A power piston 2 is movably provided in the shell 1, and a diaphragm 3 is provided over the rear surface of the power piston 2 so that the inside of the shell 1 is divided into a front constant-pressure chamber 4 and a rear variable pressure chamber 5 by the power piston 2 and the diaphragm 3.

A valve body 6 is integrally provided at a shaft portion of the power piston 2. A valve mechanism 7 for changing-over a fluid passage is housed in the valve body 6. The power piston 2 and the valve 6 are maintained by a return spring 8 at an inoperative position shown in FIG. 1.

The valve mechanism 7 is provided with a first valve seat 10 formed on the valve body 6, a second valve seat 12 formed on a valve plunger 11, and a valve element 14 arranged to be seated on the valve seats 10 and 12 by the elastic force of a spring 13 from the rear of the power piston 2 (that is, from the right in FIG. 1). In the valve mechanism 7, a portion outside the seal portion between the first valve seat 10 and the valve element 14 is communicated with the constant-pressure chamber 4 through a path 15 and the constant-pressure chamber 4 is communicated with a negative-pressure source of an intake manifold or the like, of an engine (not shown) through a negative-pressure lead-in pipe 16 provided on the shell 1.

On the other hand, an intermediate portion between the respective seal portions (that is, between the first valve seat 10 and the valve element 14 and between the second valve seat 12 and the valve element 14) is communicated with the variable-pressure chamber 5 through a path 17 formed in the valve body 6. The inside of the seal portion between the second valve seat 12 and the valve element 14 is communicated with the atmosphere through a path 19 having a filter 18. The airtight seal from the outside of the variable-pressure chamber 5 is maintained by a seal member 20 slidably positioned on the valve body 6.

The valve plunger 11 constituting the valve mechanism 7 is prevented by a key member 24 from falling out of the valve body 6. The valve plunger 11 is connected at its end portion to an input shaft 25 interlocked with a brake pedal (not shown). A top end surface of the valve plunger 11 opposes an end surface of an output shaft 26 with a reaction disc 27 interposed therebetween. A cylindrical portion 1c is formed at the shaft portion of the front shell 1a so as to project toward the inside of the shell 1. The output shaft 26 is slidably passed through a seal member 28 provided inside the cylindrical portion 1c so as to project outside the shell 1, and the projecting end of the output shaft 26 is interlocked with a piston of a not-shown master cylinder.

A large-diameter portion 6a is formed on the front outer circumference of the valve body 6, and, a stepped cylindrical portion 2a which can house the large-diameter portion 6a is formed at the shaft portion of the power piston 2. The valve body 6 is fitted into the cylindrical portion 2a of the power piston 2 from the rear side of the former, and a step end surface 2b formed at a given position of the cylindrical portion 2a is made to abut on a step end surface 6b of the valve body 6 from a rear side, so that advancing force exerted onto the power piston 2 can be transmitted to the valve body 6.

An inner circumferential bead 3a of the diaphragm 3 is connected to a radially inwardly bent inner-circumference of the cylindrical portion 2a of the power piston 2, so that when the step end surface 2b of the cylindrical portion 2a abuts on the step end surface 6b of the valve body 6, the inner circumferential bead 3a is tightly attached to the outer circumferential surface of the valve body 6 so as to seal therebetween.

Further, the cylindrical portion 2a of the power piston 2 is extended beyond the large-diameter portion 6a forwardly in the operational direction and is radially outwardly bent at a predetermined distance beyond the large-diameter portion 6a. A retainer 30 is fittingly pressed into the cylindrical portion 2a from the front side of the valve body 6 so as to abut on the front end surface of the valve body 6, so that the large-diameter portion 6a of the valve body 6 is sandwiched between the retainer 30 and the step end surface 2b of the cylindrical portion 2a.

As shown in FIGS. 1 and 2, the retainer 30 is constituted by a disc-like member in which a hole 30a for passing the output shaft 27 therethrough is formed at the shaft portion. Engaging portions 30b project radially outwardly and forwardly (to the left in FIG. 1) in a slanting manner so as to be pressed and attached to the inner circumferential surface of the cylindrical portion 2a and are formed equidistantly at an outer circumferential position. Positioning portions 30c, constituting spring seats of the return springs 8, project substantially in the same direction as the engaging portions and are intermediately positioned therebetween.

In the thus arranged embodiment, when the power piston 2 is attached to the valve body 6 the inner-circumferential bead 3a of the diaphragm 3 is first attached to the rear end portion of the cylindrical portion 2a of the power piston 2. Next, the rear end portion of the valve body 6 is fitted into the cylindrical portion 2a of the power piston 2 so that the step end surface 6b of the valve body 6 abuts on the step end surface 2b of the cylindrical portion 2a. In that state, the inner-circumferential bead 3a of the diaphragm 3 is tightly attached to the outer circumferential surface of the valve body 6 so as to seal therebetween.

In this state, under the condition that the reaction disc 27 and the output shaft 26 are attached to the retainer 30, the retainer 30 is pressed from the front side into the cylindrical portion 2a of the power piston while the output shaft 26 is passed through the hole 30a of the retainer 30, so that the retainer 30 is made to abut the front end surface of the valve body 6.

In this condition, the large-diameter portion 6a of the valve body 6 is sandwiched between the retainer 30 and the step end surface 2b of the cylindrical portion 2a of the power piston 2, so that the valve body 6 and the power piston 2 are integrally connected to each other and a rear-end large-diameter portion 26a of the output shaft 26 is prevented by the retainer 30 from falling out.

As described above, the present invention can bring effects in that the valve body and the power piston can be integrally connected to each other through an extremely inexpensive structure and the assembling workability can be improved remarkably.

What is claimed is:

1. A power piston assembly of a brake booster, comprising:
a power piston including a cylindrical portion having a through-hole, said cylindrical portion being configured in a stepped manner;
a valve body having a stepped cylindrical portion corresponding to said stepped cylindrical portion of said power piston, said valve body being disposed in said through-hole of said power piston such that said stepped cylindrical portion of said valve body engage said stepped portion of said power piston on a front side thereof;
a diaphragm provided on a rear surface of said power piston and having an inner-circumferential bead extending forwardly through said through-hole in engagement between said stepped cylindrical portion of said power piston and said stepped cylindrical portion of said valve body, said diaphragm bead being in sealing contact with said valve body;
spring means for maintaining said power piston and said valve body in an inoperative position; and
a retainer press-fitted into the cylindrical portion of said power piston from a front side thereof such that the retainer abuts the front surface of the valve body to secure said valve body in close contact with said power piston, said retainer comprising:
a disc-like member having a hole therethrough;
engaging tabs disposed on the outer circumference of said disc-like member and projecting radially outwardly and forwardly thereform in a slanting manner for engaging the inner circumferential portion of said power piston;
positioning tabs intermediately positioned between said engaging tabs and projecting in substantially the same direction as said engaging tabs for positioning said spring means.

* * * * *